Oct. 31, 1961     F. AKUTOWICZ     3,006,397

TRACTION HARNESS

Filed March 2, 1961

INVENTOR.
FRANK AKUTOWICZ
BY

United States Patent Office 3,006,397
Patented Oct. 31, 1961

3,006,397
TRACTION HARNESS
Frank Akutowicz, 2007 Harvey Road, Wilmington 3, Del.
Filed Mar. 2, 1961, Ser. No. 92,900
7 Claims. (Cl. 152—221)

This invention is in the class of flexible anti-skid devices. It comprises two enveloping halves or mittens, joined together at the top, which are slipped over the right and left hand sides of a wheel, drawn together, and fastened with a single fastener in front towards the bottom. Putting on this harness does not require jacking the wheel. In a second (topologically equivalent) embodiment of the invention the wheel must be jacked, but the fasteners for the inboard and outboard connecting loops are both outboard of the wheel. This feature considerably simplifies removal from a wheel. The harness as a whole is preferably constructed of materials routinely used in the production of tires, namely tirecord, rubber and a small amount of wire armor in the traction loops. The traction loops are constructed as disclosed in copending application No. 86,115, filed Jan. 31, 1961, the associated connecting loops and webs according to the following description and claims.

Figure 4:
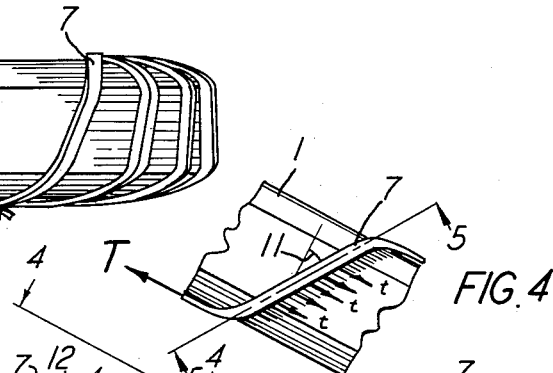
Figures 1, 2:
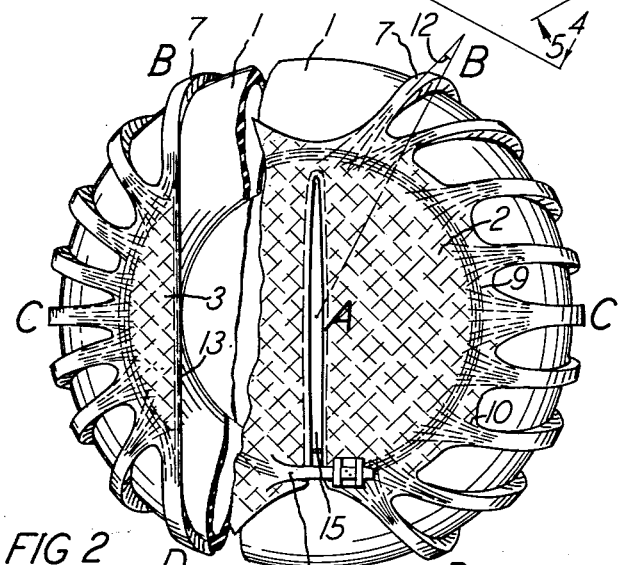
Figure 5:
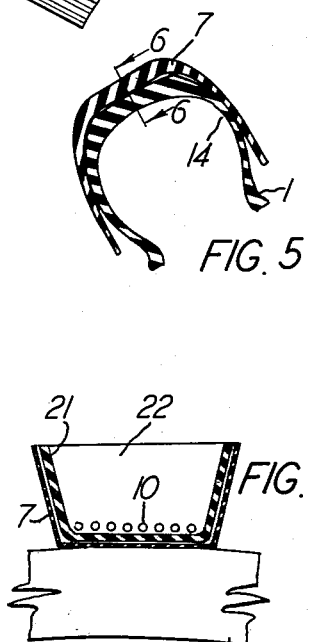
Figure 6:
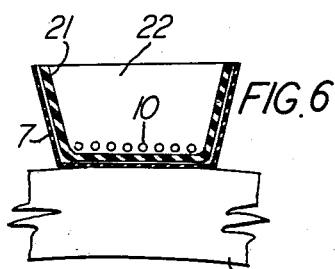
Figure 7:
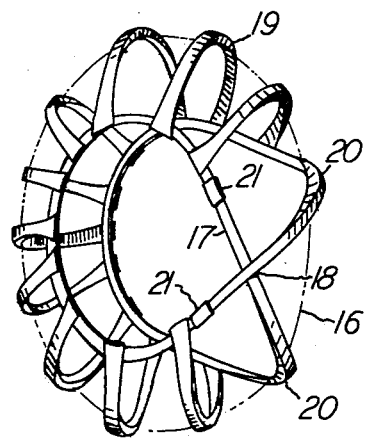
Figure 8:
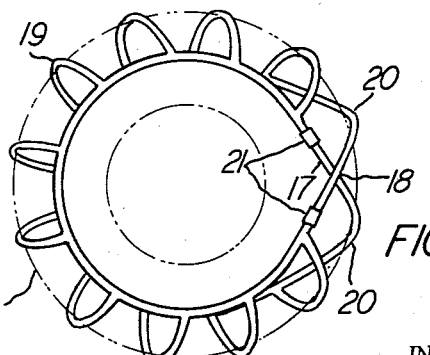

FIGURE 1 shows a view outboard of a wheel wearing a harness. FIGURE 2 is an inboard and FIGURE 3 a top view of the same wheel. FIGURE 4 is view 4 of FIGURE 1. FIGURE 5 is section 5—5 of FIGURE 4. FIGURE 6 is section 6—6 of FIGURE 5, and shows the cross section appearance of the traction loops. FIGURE 7 is a perspective view of a second embodiment of the invention incorporating connecting loops in the configuration of a figure 8 folded on itself over the tread of the tire. In this embodiment the portions of the connecting loops passing over the tread of the tire play the role of traction loops and are suitably modified. FIGURE 8 is an outboard view of the embodiment of FIGURE 7 in which is shown the uniform spacing of the crowns of the traction loops possible with this embodiment.

FIGURES 1 and 2 are aligned to show how the invention envelopes tire 1. Web 2 outboard of the wheel has generally sectorial outline ABCDA, and web 3 inboard of the wheel generally segmental outline BCDB. Traction loops 7 occupy the common arcuate boundary BCD between the sector ABCDA and the segment BCDB. The dashed lines in FIGURES 1 and 2 represent the location and direction of tire cord reinforcement, which allows the harness to be flexible but essentially non-distendable. Web 2 represents two sheets of parallel spaced non-woven cords vulcanized in position with rubber. Web 2 provides positional stabilization for connecting cord loops 9 running around the periphery of 2. The cord loops 10 reinforce the traction loops 7. These reinforcing cord loops and webs are all encased in rubber and the whole harness preferably vulcanized as a unit. The loop 9 must accommodate the tension T (FIGURE 4) which approaches or even exceeds the maximum tractive force of a road vehicle. The tractive force $t$ in FIGURE 4 generated in the footprint zone of tire 1 is balanced largely by T in the connecting loop 9. In order for this to happen, in fact, the angle 11 cannot be zero. The ideal value for angle 11 is 45 degrees, but considerable variation is possible around this value without vitiating the function of loop 7. For the same reason the angle 12, between the radial line AB and the central line of traction loop 7 at its juncture with loop 9, cannot be zero.

If angle 12 is close to zero, the mitten will tend to be skinned circumferentially from tire 1 by the force T (or −T) instead of being pressed against the tire as in this invention.

Another geometrical requirement for the harness to function as desired is that the connecting loop 13 inboard of the wheel clear the bulge 14 in the sidewall of tire 1. Failure to clear this toroidal bulge means the mitten is too small and is in serious danger of slipping off radially over the shoulder and crown of tire 1. Web 3 provides a widening of loop 13 so that the throw of the traction loops will not be exaggerated and also to simplify attachment of the traction loops to the connecting loops.

A connecting means 14 is disclosed (a strap and buckle are shown) for the two halves of the harness. Like the reinforcing loops 9, 10 and 13, the connecting means 14 must be robust and inextensible to accommodate without failure several times the maximum tractive effort of the vehicle. The split 15 allows the two halves of the harness to be opened and slipped over the wheel. Installation is completed by fastening connector 14 as tightly as possible. Connector 14 must be adjustable to allow for wear in the tire. The harness structure of rubber and tire cord vulcanized into a unit has sufficient body under human hand forces so that its inherent shape is maintained while the mittens are being put on. Once they are on tension in connector 14 and connecting loop 9 holds the two mittens together in symmetrical mutually tensioning counterpoise. Traction loads in either direction serve to increase tension in loops 9 and 13 so that when working the mittens grip the tire even more tenaciously. Also when working the inherent flexibility of the harness accommodates itself readily to the deformations naturally occuring in tire 1.

Figure 3:
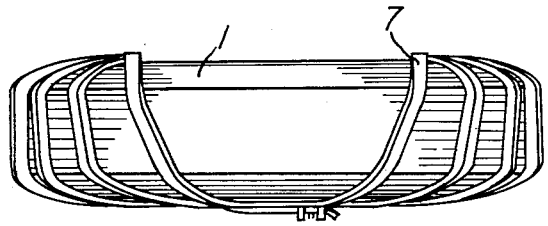

FIGURE 3 shows that parts of the circumference of tire 1 have no traction loops. Since the traction loops are made mostly of rubber, and for the most part follow a skewed path across the tread of the tire, the two large gaps around the wheel do not generate objectionable vibrations. On tires thinner than they usually are at present the gaps are big enough to fit a second pair of mittens on the wheel disposed at right angles to the first pair, but this is usually impossible on the fat tires in current use.

If a uniform band of traction loops is desired the embodiment shown in FIGURES 7 and 8 can be used. In these figures the tire is shown only in phantom outline 16 in order to show the course of the connecting loop 17. Loop 17 has a figure 8 configuration folded over the tread at the zones 20 with the cross point at 18, the two ovals of the figure 8 forming the inboard and outboard connecting loops for the traction loops 19. The connecting loop 17 plays the role of a traction loop at the tread crossing zones 20. These zones 20 are appropriately modified to have the traction cross section shown in FIGURE 6 where 10 represents the cord reinforcement, 21 the row of wire wickets armoring the traction loop, and both cord and wire vulcanized together with tread stock rubber 22. The connectors 21 are adjustable to allow for wear in tire 19. Connectors 21 are located in the outboard oval of the figure 8 removed as far as possible from cross point 18. The two connectors 21 could be replaced by a single connector almost anywhere on loop 17, the most convenient location determinable by experimentation in a routine fashion. At cross point 18 loop 17 is permanently vulcanized to itself. The harness functions most efficiently if this is done, although a removable non-adjustable connector could be used at point 18 to prevent shifting of the traction loops 20 during violent maneuvers.

FIGURE 8 shows that the crowns of the traction loops 19 and of the loops 20 are evenly spaced around the periphery of wheel 16, although they follow skewed courses across the tire 16, different loops skewed to different degrees. This produces a quiet running harness.

The harness is installed by passing the inboard oval of loop 17 over a diameter of tire 16. With connectors 21 open the outboard oval can be expanded enough to slip the harness over the circumference of wheel 16, the loops 20 are then simultaneously passed over the tire and connectors 21 fastened.

Both the preferred embodiment (FIGURE 1) and the second embodiment (FIGURE 7) can be constructed of other flexible inextensible material such as steel link chain because when working the harness elements are in tension. However, the construction specified above and claimed below is preferred because the form preserving character of rubber and cord makes the harness easier to install and remove than if made, say, of chain. Also in the matters of quietness, freedom from vibration, light weight and long life the rubber-cord combination is preferable.

I claim:

1. In a traction harness fitted to a road vehicle tire said traction harness made of tire cord, rubber and wire and comprising traction loops vulcanized in position by connecting loops of tire cord and rubber and webs of tire cord and rubber the combination of a mitten-like configuration of said loops and webs of sectorial outline outboard of said tire and segmental outline inboard of said tire, said sectorial outline having a common arcuate boundary with said segmental outline, said traction loops occupying said common arcuate boundary, said connecting loops reinforcing the edges of said webs.

2. In a traction harness as defined in claim 1 wherein said mitten-like configurations are provided with top and bottom tension joining means for joining two of said mitten-like configurations together outboard of said tire in symmetrical mutually tensioning counterpoise on said tire.

3. The combination as defined in claim 2 wherein said top tension joining means comprises cord reinforcement permanently vulcanized in place and said bottom tension joining means comprises separable, adjustable connecting means, said top and bottom tension joining means joining like ends of said arcuate boundaries.

4. In a traction harness fitted to a road vehicle tire, said traction harness made of flexible inextensible material and comprising traction loops permanently fixed in position to inboard and outboard connecting loops the combination comprising a figure 8 configuration of said connecting loops said figure 8 folded on itself over the tread of said tire to form said inboard and said outboard connecting loops.

5. The combination as defined in claim 4 further restricted to rubber, tire cord and wire for materials of construction and with traction loops provided in position on said connecting loops at the crossings of said tread.

6. The combination as defined in claim 4 together with adjustable joining means for said connecting loops said joining means located on said outboard loop.

7. The combination as defined by claim 4, together with non-adjustable loop joining means for said connecting loops where the connecting loops fold over the tread of the tire.

References Cited in the file of this patent

UNITED STATES PATENTS

| | | |
|---|---|---|
| 1,932,576 | Dodge | Oct. 31, 1933 |
| 2,856,979 | Branch | Oct. 21, 1958 |

FOREIGN PATENTS

| | | |
|---|---|---|
| 304,219 | Great Britain | Jan. 14, 1929 |